United States Patent [19]

Guilbault

[11] 3,993,712

[45] Nov. 23, 1976

[54] WATER-SOLUBLE VINYL-PYRROLIDONE BLOCK COPOLYMERS

[75] Inventor: Lawrence James Guilbault, Topsfield, Mass.

[73] Assignee: Calgon Corporation, Pittsburgh, Pa.

[22] Filed: June 6, 1975

[21] Appl. No.: 584,552

Related U.S. Application Data

[62] Division of Ser. No. 465,660, April 30, 1974, Pat. No. 3,907,927.

[52] U.S. Cl. .......................... 260/875; 260/29.6 HN; 260/29.6 SQ; 260/885; 210/54
[51] Int. Cl.² ..................... C08F 15/00; C08F 45/24
[58] Field of Search ................................ 210/52–54; 260/875

[56] References Cited

UNITED STATES PATENTS

| 2,940,952 | 6/1960 | Miller | 260/45.5 |
|---|---|---|---|
| 3,146,193 | 8/1964 | Sullivan | 210/54 C |
| 3,406,155 | 10/1968 | Azorlosa et al. | 260/80.3 |
| 3,412,020 | 11/1968 | Azorlosa | 210/54 C |
| 3,414,513 | 12/1968 | Buhl et al. | 210/54 C |
| 3,417,054 | 12/1968 | Merijan et al. | 260/66 |
| 3,452,867 | 1/1969 | Bishop | 210/54 C |
| 3,468,832 | 9/1969 | Barabas et al. | 260/29.6 |
| 3,692,673 | 9/1972 | Hoke | 210/52 |
| 3,776,983 | 12/1973 | Iovine et al. | 260/901 |

*Primary Examiner*—Thomas G. Wyse
*Attorney, Agent, or Firm*—Rudolph J. Anderson, Jr.; Harry E. Westlake; Martin L. Katz

[57] ABSTRACT

Block polymers of the A-B-A type wherein the A block is derived from a water-soluble monomer and the B block is derived from N-vinyl pyrrolidone. The polymers are water soluble and are useful as flocculants.

3 Claims, No Drawings

WATER-SOLUBLE VINYL-PYRROLIDONE BLOCK COPOLYMERS

This application is a division of U.S. application Ser. No. 465,660, filed Apr. 30, 1974, now U.S. Pat. No. 3,907,927.

This invention relates to the synthesis of novel, water-soluble polymeric compositions and to the use of these polymers as flocculants.

More particularly, this invention relates to the synthesis of novel, water-soluble polymeric compositions of the A-B-A type wherein the A block represents from 10 to 100,000 mer units of a water-soluble monomer and the B block represents from 10 to 5,000 mer units of N-vinyl pyrrolidone and to the use of these polymeric compositions as flocculants.

Water-soluble block polymers are disclosed in U.S. Pat. No. 3,776,983 and water-soluble mixtures of polyalkeneoxide and polyvinylpyrrolidones are disclosed in U.S. Pat. No. 3,776,310. However, heretofore the polymers of the instant invention have not been known.

The ceric ion method taught by U.S. Pat. No. 2,922,768 and J. Macromolecular Science-Chemistry, A 7(8), 1581 (1973) has been found to be a convenient means of accomplishing the block copolymer synthesis of the instant invention.

Suitable water-soluble monomers include dimethyl diallyl ammonium chloride, 3-acrylamido-3-methyl butyl trimethyl ammonium chloride, methacryloyloxy-2-hydroxypropyl trimethyl ammonium chloride, methacryloyloxyethyl trimethyl ammonium chloride, methacryloyloxyethyl trimethyl ammonium methosulfate, 2-acrylamido-2-methyl propane sulfonic acid, acrylic acid and salts thereof, methacrylic acid, 3-acrylamido-3-methyl butyl dimethylamine, acrylamide, methacrylamide, diacetone acrylamide, hydroxymethylated diacetone acrylamide, dimethyl-1-(2-hydroxypropyl) amine methacrylamide, and sodium styrene sulfonate. The preferred monomers, however, are 3-acrylamido-3-methyl butyl trimethyl ammonium chloride, 2-acrylamido-2-methyl propane sulfonic acid, dimethyl diallyl ammonium chloride, methacryloyloxyethyl trimethyl ammonium chloride, methacryloyloxyethyl trimethyl ammonium methosulfate, and acrylamide.

The polymeric compositions of the instant invention are useful as flocculants for the precipitation of many substances from municipal and industrial wastes and may be employed for this purpose, alone or in conjunction with inorganic coagulants. Generally, from 0.1 ppm to 20 ppm of polymer are maintained in the aqueous system being treated.

The invention will be better understood by the following examples which illustrate the preparation and effectiveness of representative polymers of this invention.

EXAMPLE 1

Preparation of Poly(Vinylpyrrolidone-b-Acrylamide)

A 1 liter, 4-neck flask fitted with a mechanical stirrer, condenser, nitrogen inlet and catalyst addition tube was charged with 16.00 g. acrylamide, 2.78 g. poly(vinylpyrrolidone), m.w.=360,000 and 500 ml distilled water. After stirring the contents for an hour under a nitrogen purge, a solution of 0.123 g. ceric ammonium nitrate, 2.25 ml 1 N $HNO_3$ and 10 ml water was added dropwise over a 3 hour period. The reaction solution became very viscous and wrapped around the stirrer shaft. After 16 hours at room temperature, the resulting polymer gel was precipitated into methanol in a blender. The solid product was isolated, washed with methanol and dried in vacuo. The product, obtained in 86% yield, exhibited an intrinsic viscosity in 1 N $NaNO_3$ of 6.3 dl/g. The composition of the block polymer, determined by infrared analysis was 90 mole percent acrylamide, 10 mole percent vinylpyrrolidone. The following equation (Guilbault and Brooks, J. Macromolecular Science-Chemistry, A7(8), 1581 (1973), was employed to calculate the molecular weight of the acrylamide end blocks:

$$G = \left(\frac{S}{C} - S\right)/N$$

Where
$G$ = d.p. of the end blocks
$S$ = d.p. of polyvinylpyrrolidone = 3200
$N$ = no. of end blocks per polyvinylpyrrolidone block = 2
$C$ = composition, as mole fraction vinylpyrrolidone The block polymer structure calculated by this method was:

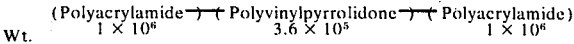

Mol. Wt. (Polyacrylamide—Polyvinylpyrrolidone—Polyacrylamide)
$1 \times 10^6$  $\quad$  $3.6 \times 10^5$  $\quad$  $1 \times 10^6$

EXAMPLE 2

Preparation of poly(Vinylpyrrolidone-b-Acrylamide)

A 1 liter, 4-neck flask fitted with a mechanical stirrer, condenser, nitrogen inlet and catalyst addition tube was charged with 6.75 g acrylamide, 0.56 g poly(vinylpyrrolidone), m.w.=360,000 and 100 ml distilled water. After stirring the contents for an hour under a nitrogen purge, a solution of 0.052 g ceric ammonium nitrate, 0.95 ml 1 N $HNO_3$ and 10 ml water was added dropwise over a 3 hour period. The reaction solution became very viscous and wrapped around the stirrer shaft. After 16 hours at room temperature, the resulting polymer gel was precipitated into methanol in a blender. The solid product was isolated, washed with methanol and dried in vacuo. The product, obtained in 90% yield, exhibited an intrinsic viscosity in 1 N $NaNO_3$ of 7.5 dl/g. The composition of the block polymer, determined by infrared analysis was 95 mole percent acrylamide, 5 mole percent vinylpyrrolidone.

The block polymer structure, calculated by the method of Example 1 was:

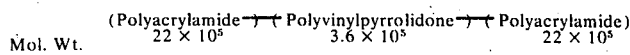

Mol. Wt. (Polyacrylamide—Polyvinylpyrrolidone—Polyacrylamide)
$22 \times 10^5$  $\quad$  $3.6 \times 10^5$  $\quad$  $22 \times 10^5$

EXAMPLE 3

Preparation of Poly(Vinylpyrrolidone-b-Acrylamide)

A 1 liter, 4-neck flask fitted with a mechanical stirrer, condenser, nitrogen inlet and catalyst addition tube was charged with 13.33 g acrylamide, 6.95 g poly(vinylpyrrolidone), m.w.=360,000 and 500 ml distilled water. After stirring the contents for an hour under a nitrogen purge, a solution of 0.103 g ceric ammonium nitrate, 1.88 ml 1 N $HNO_3$ and 10 ml water was added dropwise over a 3 hour period. The reaction solution became very viscous and wrapped around the stirrer shaft. After 16 hours at room temperature, the resulting polymer gel was precipitated into methanol in a blender. The solid product was isolated, washed with methanol and dried in vacuo. The product, obtained in 85% yield, exhibited an intrinsic viscosity in 1 N $NaNO_3$ of 3.2 dl/g. The composition of the block polymer, determined by infrared analysis was 73 mole percent acrylamide, 27 mole percent vinylpyrrolidone.

The block polymer structure, calculated by the method of Example 1 was:

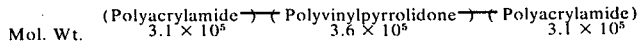

Extraction experiments demonstrated that the polyvinylpyrrolidone present in the product is incorporated into the block polymer structure. A sample (6.22 g) of a 27.9 mole percent vinyl pyrrolidone block polymer was extracted with refluxing methanol (a good solvent for polyvinylpyrrolidone) in a Soxhlet Thimble for 24 hours. The extracted sample weighed 6.20 g and analyzed for 27.1 mole percent vinylpyrrolidone.

EXAMPLE 4

Preparation of Poly(Vinylpyrrolidone-b-Acrylamide)

A 1 liter, 4-neck flask fitted with a mechanical stirrer, condenser, nitrogen inlet and catalyst addition tube was charged with 8.88 g acrylamide, 13.88 g poly(vinylpyrrolidone), m.w. = 360,000 and 500 ml distilled water. After stirring the contents for an hour under a nitrogen purge, a solution of 0.069 g ceric ammonium nitrate, 1.25 ml 1 N $HNO_3$ and 10 ml water was added dropwise over a 3 hour period. The reaction solution became very viscous and wrapped around the stirrer shaft. After 16 hours at room temperature, the resulting polymer gel was precipitated into methanol in a blender. The solid product was isolated, washed with methanol and dried in vacuo. The product, obtained in 83% yield, exhibited an intrinsic viscosity in 1N $NaNO_3$ of 3.4 dl/g. The composition of the block polymer, determined by infrared analysis was 56 mole percent acrylamide, 44 mole percent vinylpyrrolidone.

The block polymer structure, calculated by the method of Example 1 was:

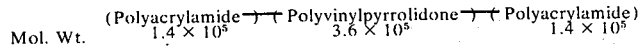

EXAMPLE 5

Preparation of Poly(Vinylpyrrolidone-b-Acrylamide)

A 1 liter, 4-neck flask fitted with a mechanical stirrer, condenser, nitrogen inlet and catalyst addition tube was charged with 5.33 g acrylamide, 19.43 g poly(vinylpyrrolidone), m.w. = 360,000 and 500 ml distilled water. After stirring the contents for an hour under a nitrogen purge, a solution of 0.041 g ceric ammonium nitrate, 0.75 ml 1 N $HNO_3$ and 10 ml water was added dropwise over a 3 hour period. The reaction solution became very viscous and wrapped around the stirrer shaft. After 16 hours at room temperature, the resulting polymer gel was precipitated into methanol in a blender. The solid product was isolated, washed with methanol and dried in vacuo. The product, obtained in 54% yield, exhibited an intrinsic viscosity in 1 N $NaNO_3$ of 3.5 dl/g. The composition of the block polymer, determined by infrared analysis was 50 mole percent acrylamide, 50 mole percent vinylpyrrolidone.

The block polymer structure, calculated by the method of Example 1 was:

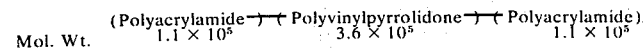

EXAMPLE 6

Preparation of Poly(Vinylpyrrolidone-b-2-Acrylamido-2-Methyl Propane Sulfonic Acid)

This polymer was prepared in a manner analogous to Example 1, using 5.18 g 2-acrylamido-2-methyl propane sulfonic acid, 8.33 g poly(vinylpyrrolidone), m.w. = 360,000 and 100 ml water. The catalyst solution contained 0.25 ml 1 N $HNO_3$, 0.014 g ceric ammonium nitrate and 10 ml water. The product, obtained in 76% yield was isolated from the reaction gel by precipitation into acetone. Utilizing the equation of Example 1, the molecular weight of each end block was found to be $1\times10^5$, and that of the poly(vinylpyrrolidone) center block, $3.6\times10^5$. The block polymer contained 24 mole percent anionic monomer units, as measured by infrared analysis.

EXAMPLE 7

Preparation of
Poly(Vinylpyrrolidone-b-2-Acrylamido-2-Methyl Propane Sulfonic Acid)

This polymer was prepared in a manner analogous to Example 1, using 15.53 g 2-acrylamido-2-methyl propane sulfonic acid. 2.78 g poly(vinylpyrrolidone), m.w. = 360,000 and 100 ml water. The catalyst solution contained 0.75 ml 1 N $HNO_3$, 0.041 g ceric ammonium nitrate and 10 ml water. The product, obtained in 54% yield was isolated from the reaction gel by precipitation into acetone. Utilizing the equation of Example 1, the molecular weight of each end block was found to be $4.8 \times 10^5$, and that of the poly(vinylpyrrolidone) center block, $3.6 \times 10^5$. The block polymer contained 60 mole percent anionic monomer units, as measured by infrared analysis.

EXAMPLE 8

Preparation of
Poly(Vinylpyrrolidone-b-2-Acrylamido-2-Methyl Propane Sulfonic Acid)

This polymer was prepared in a manner analogous to Example 1, using 10.35 g 2-acrylamido-2-methyl propane sulfonic acid, 5.55 g poly(vinylpyrrolidone), m.w. = 360,000 and 100 ml water. The catalyst solution contained 0.50 ml 1 N $HNO_3$, 0.027 g ceric ammonium nitrate and 10 ml water. The product, obtained in 61% yield was isolated from the reaction gel by precipitation into acetone. Utilizing the equation of Example 1, the molecular weight of each end block was found to be $2.1 \times 10^5$, and that of the poly(vinylpyrrolidone) center block, $3.6 \times 10^5$. The block polymer contained 39 mole percent anionic monomer units, as measured by infrared analysis.

EXAMPLE 9

Preparaton of
Poly(Vinylpyrrolidone-b-Methacryloyloxyethyl Trimethyl Ammonium Chloride This polymer was prepared as in Example 1, using 10.86 g of the cationic monomer, 5.55 g poly(vinylpyrrolidone), m.w. = 360,000 and 100 ml water. The catalyst solution, comprised of 0.50 ml 1 N $HNO_3$, 0.274 g ceric ammonium nitrate and 10 ml water, was added at the beginning of the reaction. The product was obtained in 78% yield by precipitation of the reaction mixture into acetone. The block polymer contained 51 mole percent cationic monomer units, as measured by chloride titration. Utilizing the equation of Example 1, the molecular weight of each end block was found to be $3.4 \times 10^5$, and that of the poly(vinylpyrrolidone) center block $3.6 \times 10^5$.

EXAMPLE 10

Preparation of
Poly(Vinylpyrrolidone-b-Methacryloyloxyethyl Trimethyl Ammonium Chloride This polymer was prepared as in Example 1, using 16.30 g of the cationic monomer, 2.78 g poly(vinylpyrrolidone), m.w.= 360,000 and 100 ml water. The catalyst solution, comprised of 2.5 ml 1 N $HNO_3$, 1.37 g ceric ammonium nitrate and 10 ml water, was added at the beginning of the reaction. The product was obtained in 63% yield by precipitation of the reaction mixture into acetone. The block polymer contained 80 mole percent cationic monomer units, as measured by chloride titration. Utilizing the equation of Example 1, the molecular weight of each end block was found to be $13 \times 10^5$, and that of the poly(vinylpyrrolidone) center block $3.6 \times 10^5$.

EXAMPLE 11

Preparation of
Poly(Vinylpyrrolidone-b-Methacryloyloxyethyl Trimethyl Ammonium Chloride This polymer was prepared as in Example 1, using 5.44 g of the cationic monomer, 8.33 poly(vinylpyrrolidone), m.w. = 360,000 and 100 ml water. The catalyst solution, comprised of 0.75 ml 1N $HNO_3$, 0.411 g ceric ammonium nitrate and 10 ml water, was added at the beginning of the reaction. The product was obtained in 89% yield by precipitation of the reaction mixture into acetone. The block polymer contained 20 mole percent cationic monomer units, as measured by chloride titration. Utilizing the equation of Example 1, the molecular weight of each end block was found to be $0.8 \times 10^5$, and that of the poly(vinylpyrrolidone) center block $3.6 \times 10^5$.

EXAMPLE 12

The effectiveness of the polymers of the instant invention as aids in liquid/solid separation is illustrated in Table I in which kaolin is gradually added to vigorously stirred water. After it is well dispersed (a few minutes) it is diluted in a calibrated beaker to a kaolin concentration of 20 g/100 ml and kept mixed with a magnetic stirrer. After overnight stirring, the pH is measured and maintained at 4.5 35 0.5. 0.10 g of ammonium acetate per 20 g of kaolin is added and the suspension is adjusted to a pH of 6.0 with 1N NaOH (about 1 – 2 ml). A three bladed plastic stirrer is then positioned in 500 ml graduated cylinder so that the blades are between the 250 ml and 275 ml mark, and 100 ml of stock suspension is added to 350 ml of water in the 500 ml graduate and stirred at 250 rpm for 30 seconds. Fifty ml of diluted polymer solution is added and the stirring continued for 15 seconds. The stirring is then stopped and settling times are recorded from the 450 mark to the 350, 250, and 200 ml marks. An average settling rate (cm/min), based on the 350 and 250 ml times, is then calculated by dividing the number of cm/100 ml for the graduated cylinder by the average settling time per 100 ml and multiplying the result by 60.

Table 1

| | Polymer Dosage (ppm) | Kaolin Settling Test* Settling Rate(cm/min.) |
|---|---|---|
| Example 2 | 2.0 | 13 |
| Example 3 | 2.0 | 7.2 |
| Example 4 | 2.0 | 5.8 |
| Example 5 | 2.0 | 7.0 |
| Example 6 | 2.0 | 8.9 |
| Example 7 | 2.0 | 6.7 |
| Example 8 | 2.0 | 2.7 |

*1 μm kaolin

I claim:
1. A block polymer of the formula A-B-A wherein the A block represents from 10 to 100,000 mer units of a water-soluble monomer selected from the group consisting of 3-acrylamido-3-methyl butyl trimethyl ammonium chloride, 2-acrylamido-2-methyl propane sul- fonic acid, dimethyl diallyl ammonium chloride, methacryloyloxyethyl trimethyl ammonium chloride, and methacryloyloxyethyl trimethyl ammonium methosulfate, and the B block represents from 10 to 5,000 mer units of N-vinylpyrrolidone.

2. A composition as in claim 1 wherein the water-soluble monomer is 2-acrylamido-2-methyl propane sulfonic acid.

3. A composition as in claim 1 wherein the water-soluble monomer is methacryloyloxyethyl trimethyl ammonium chloride.

* * * * *

UNITED STATES PATENT AND TRADEMARK OFFICE
CERTIFICATE OF CORRECTION

PATENT NO. : 3,993,712
DATED : November 23, 1976
INVENTOR(S) : Lawrence James Guilbault It is certified that error appears in the above-identified patent and that said Letters Patent are hereby corrected as shown below:

Column 2, Example 2, Line 46 should read -- Preparation of Poly(Vinylpyrrolidone-b-Acrylamide) --.

Column 6, Example 12, Line 35, "4.5 35 0.5." should read -- $4.5 \pm 0.5$. --.

Signed and Sealed this

First Day of March 1977

[SEAL]

Attest:

RUTH C. MASON
*Attesting Officer*

C. MARSHALL DANN
*Commissioner of Patents and Trademarks*